Jan. 20, 1948. J. W. CONKLIN 2,434,836
SELSYN-CONTROLLED ELECTRIC MOTOR SYSTEM
Filed Aug. 29, 1941
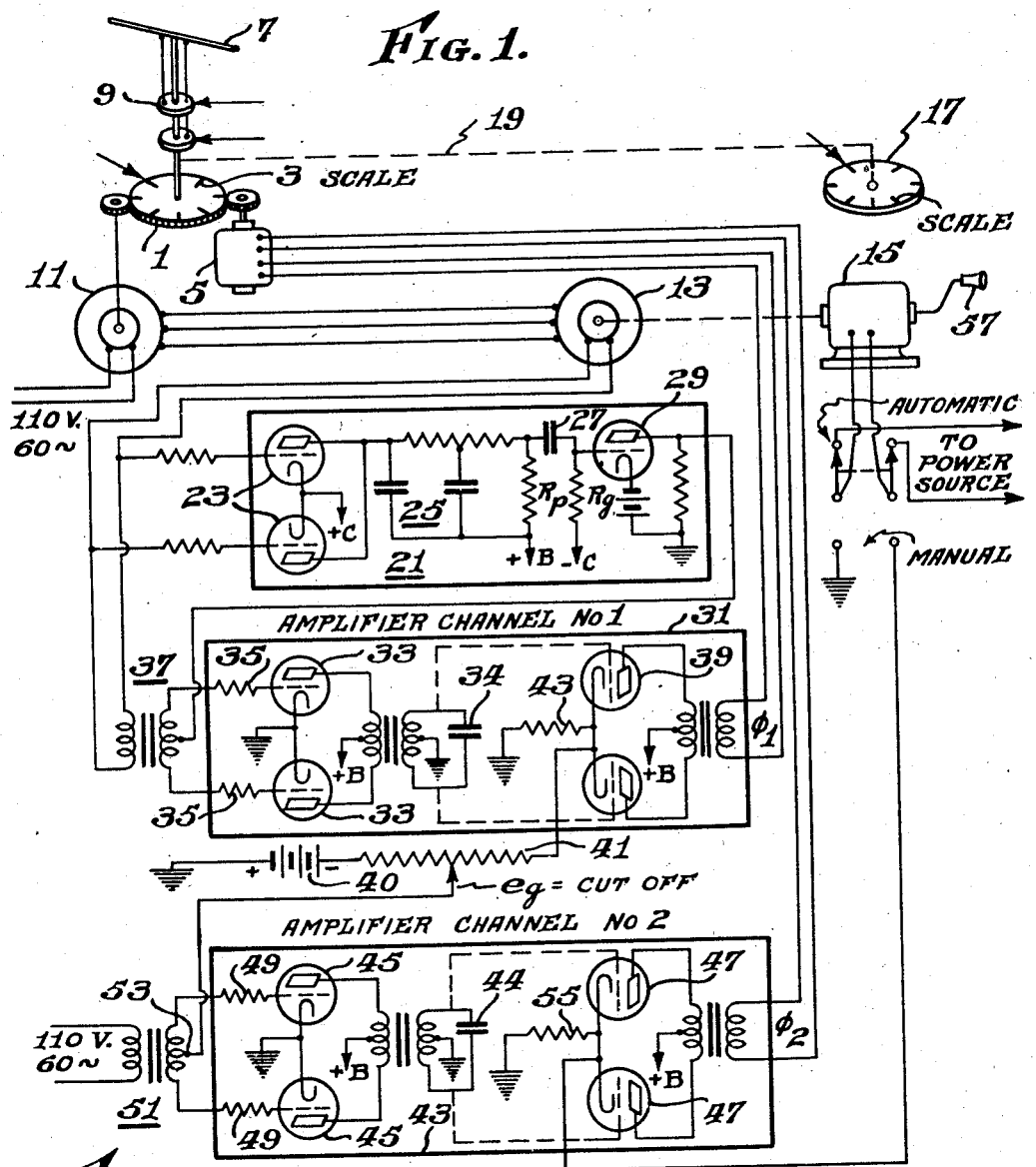
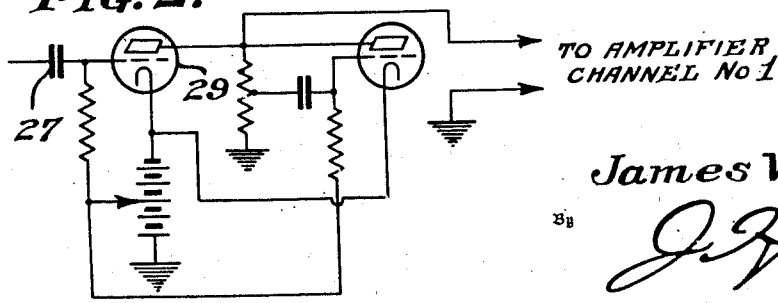
Inventor
James W. Conklin
By
J. Huff
Attorney Patented Jan. 20, 1948

2,434,836

UNITED STATES PATENT OFFICE 2,434,836

SELSYN-CONTROLLED ELECTRIC MOTOR SYSTEM

James W. Conklin, Audubon, N. J., assignor to Radio Corporation of America, a corporation of Delaware Application August 29, 1941, Serial No. 408,897

6 Claims. (Cl. 318—30)

1

This invention relates to remote control devices and especially to improvements in remote control systems in which a remote device is made to repeat accurately and quickly the positions of a local controlling device.

It is known that servo and follow-up devices may be used to move one object in synchronism with another if precautions are taken to prevent lag, overshooting and hunting. The instant invention has as one of its objects the provision of improved means for moving one object in synchronism with another with minimum lag and with substantial freedom from hunting. Another object is to provide improved electrical circuits for a servo or follow-up device in which electrical networks are arranged to compensate for the various instabilities which characterize such systems. Another object is to provide improved electrical means for directing the movements of a controlled element in synchronism with a controlling element without introducing instability or hunting.

The invention will be described by referring to the accompanying drawing in which Figure 1 is a schematic circuit diagram of one embodiment of the invention; and Figure 2 is a schematic diagram of a pair of rectifiers used in a modification of the invention. Similar reference characters indicate similar elements.

A turntable 1, which may be provided with a scale 3, is driven by a two phase motor 5. The remote element to be controlled is mounted on the turntable. By way of example, an antenna 7 is shown. The antenna may be connected to radio equipment through slip-rings 9 or the like. The turntable 1 is also coupled to a "Selsyn" motor 11 which is energized by a suitable source of polyphase A.-C. energy which is not shown.

The "Selsyn" at the turntable is connected electrically to a second "Selsyn" motor 13, which is coupled to the controlling motor 15. The controlling motor is located at the point at which the control is to be exercised. At this point a repeater scale 17 may be arranged to indicate the turntable position. The repeater scale may be driven by mechanical or electrical means indicated by the dash line 19.

The output of the second "Selsyn" device 13 is applied to the input of an amplifier 21 which may include a pair of push pull thermionic tubes 23 and a filter 25. The output of the amplifier is applied through a capacitor 27 to the input of a rectifier 29. The rectifier is normally biased approximately to cut-off as indicated. The output of the device 13 is also applied to the input

2 of an amplifier channel 31 which will hereinafter be called channel No. 1. The input of channel No. 1 includes a pair of push pull tubes 33 whose grids are connected through resistors 35 to the input transformer 37. A point intermediate the ends of the secondary of the input transformer is connected to the output of the rectifier 29 so that the channel No. 1 is responsive to the rectified output current.

The initial amplifier 33 may be connected through one or more stages, preferably of push pull class B type, to a final output stage 39 of push pull class B amplification. The output of the final stage 39 of channel No. 1 provides one phase $\phi_1$ of the current for operating the two phase motor 5. In addition to the current for the motor 5, the final stage provides a rectified current which is derived in the cathode anode circuit of the amplifier 39. A potentiometer 41 is connected across the cathode resistor 43 to provide a network from which a desired potential is selected for application to a second amplifier channel 43.

The second amplifier channel 43 will be hereinafter called channel No. 2. Channel No. 2 includes two or more amplifiers 45, 47. The output amplifier 47 is preferably of the push pull class B type used in channel No. 1. The input amplifier 45 includes grid resistors 49, which are connected to the secondary of the input transformer 51. A point 53 intermediate the terminals of the secondary is connected to the potentiometer 41 so that biasing potentials may be applied to the input amplifier 45. The biasing potentials are of two kinds: One is the steady bias obtained from the battery 40 and potentiometer 41; the other is a bias derived from the potential drop across the cathode resistor 43. The latter potential corresponds to the displacement and rate of displacement of the rotor of the second "Selsyn" so that the output of channel No. 2 is suitably controlled. The input to the transformer 51 includes alternating currents of the frequency of the source to provide the second phase $\phi_2$ for operating the motor 5. In some instances the second phase $\phi_2$ may be applied directly to the motor without controlling the amplitude of the applied currents. In that event the other phase $\phi_1$ is controlled as previously described. It is preferable to control both phases. In either case the currents $\phi_2$ are applied to the motor 5.

The cathode-anode current flowing in the final stage 47 passes through a resistor 55 which corresponds to the resistor 43 in channel No. 1. The cathode or high potential terminal of the resistor 55 is connected to the controlling motor 15 so that a braking force, which is proportional to the output of channel No. 2 may be applied to the motor 15 when the double throw switch 56 is in the position for manual control. The braking action prevents the operator from turning the control faster than a predetermined rate. For large displacements the controlling motor 15 may be power driven at speeds not exceeding the predetermined rate for which the system is designed. The braking force may be derived from either amplifier channel.

The operation is essentially as follows: The operator turns the handle 57 of the controlling motor 15. This changes the angular position of the rotor of the second "Selsyn" 13 with respect to the rotor of the first "Selsyn" 11 and hence with respect to the turntable 1. An alternating current is induced in the rotor of the second "Selsyn" 13 and is applied to the input of the rectifier channel and to the input of channel No. 1. The applied current is amplified in channel No. 1. The amplification depends upon amplitude of the rectified current in the rectifier 29 and the amplitude of the rectified current is roughly proportional to the velocity, or a suitable function thereof, at which the motor 15 is turned because the currents, proportional to the displacement, are passed through the capacitor 27 which applies to the rectifier a current corresponding to the first derivative of the displacement. Thus the output currents of channel No. 1 correspond not only to the displacement of the control but also to the rate of such displacement. Furthermore, since the current in the final stage 39 is suitably applied to control the gain of channel No. 2, it follows that the gain in channel No. 2 corresponds to the displacement and rate or velocity of displacement. The output currents $\phi 1$ and $\phi 2$ of the two channels (No. 1 and No. 2) are applied to the motor 5 which is connected to drive the turntable in the direction of the displacement, or in the direction corresponding to the position of the control 15. As the operator brings the control motor 15 to rest the rate of such change is again applied to the two channels so that the motor 5 is brought quickly to rest without any tendency to overshoot or hunt. In the final position no voltage appears across the rotor of the second "Selsyn" and therefore the outputs of the channels No. 1 and No. 2 are zero. The sense of direction of the initial rotation of the motor depends upon the phase of the current applied to the input of the No. 1 channel. Capacitors shunting the transformers in the channels correct the wave form and increase the output and hence motor torque.

Thus the system is described as an improved servo or follow-up system in which a controlled element is moved in synchronism with a controlling element without instability or hunting. The control is effected by applying to a pair of amplifier channels voltages corresponding to the displacement and velocity of displacement of the controlling element. One of the amplifier channels controls the sense of motion. Means are also provided for braking automatically the controlling element so that the operator will not be able to accelerate the device beyond predetermined limits. It should be understood that currents corresponding to acceleration or deceleration may be applied by further differentiation and rectification, which may be effected by the circuit arrangement of Fig. 2. In a like manner currents corresponding to higher derivatives may be applied. Instead of "Selsyn" devices, potentiometers of the type disclosed in D. S. Bond U. S. Patent 2,208,623 may be used, or any equivalent control devices which are commercially available.

I claim as my invention:

1. A position control system including a control element, a controlled element, a motor for driving said controlled element, means responsive to the relative displacement of said elements for deriving currents proportional to said displacement, a rectifier, differentiating means for applying said derived currents to said rectifier to obtain therefrom rectified currents corresponding to the rate of said displacement, a first amplifier channel for amplifying said derived currents and applying said amplified currents to said motor, means for applying the said rectified currents to said amplifier to control its gain, a second amplifier channel for applying additional currents to said motor, and means including said first amplifier channel for controlling the gain of said second channel as a function of the rectified output of said first channel.

2. A position control system including a control element, a controlled element, means for deriving a controlling force corresponding to the relative displacement of said elements, a motor for driving said controlled element, an amplifier having its output applied to said motor and its input responsive to said controlling force, means for deriving a second controlling force corresponding to a derivative of said displacement, means for applying said second controlling force to said amplifier to vary its amplification whereby compensating forces are applied to said motor to minimize lag and hunting, means for deriving a braking force corresponding to the output of said amplifier, and means for applying said braking force to said control element to limit the rate at which said control element may be displaced.

3. A position control system including a control element, a controlled element, a motor for driving said controlled element, means responsive to the relative displacement of said elements for deriving currents proportional to said displacement, a rectifier, differentiating means for applying said derived currents to said rectifier to obtain therefrom rectified currents corresponding to the rate of said displacement, a first amplifier channel for amplifying said derived currents and applying said amplified currents to said motor, means for applying the said rectified currents to said amplifier to control its gain, a second amplifier channel for applying additional currents to said motor, means including said first amplifier channel for controlling the gain of said second channel as a function of the rectified output of said first channel, means for deriving a braking force corresponding to the output of one of said amplifier channels, and means for applying said braking force to said control element to limit the rate at which said control element may be displaced.

4. A position control system including a control element, a controlled element, a two phase motor for driving said controlled element, means responsive to the relative displacement of said elements for deriving alternating currents proportional to said displacement, a rectifier, differentiating means for applying said derived alternating currents to said rectifier to obtain therefrom rectified currents corresponding to the rate of said displacement, a first amplifier channel for amplifying said derived currents and applying amplified currents of one phase to said motor, means for applying the said rectified currents to said amplifier to control its gain, a second amplifier channel for applying alternating currents of a second phase to said motor, and means including said first amplifier channel for controlling the gain of said second channel as a function of the rectified output of said first channel.

5. A position control system including a control element, a controlled element, a two phase motor for driving said controlled element, means responsive to the relative displacement of said elements for deriving alternating currents proportional to said displacement, a rectifier, differentiating means for applying said derived alternating currents to said rectifier to obtain therefrom rectified currents corresponding to the rate of said displacement, a first amplifier channel for amplifying said derived currents and applying amplified currents of one phase to said motor, means for applying the said rectified currents to said amplifier to control its gain, a second amplifier channel for applying alternating currents of a second phase to said motor, means including said first amplifier channel for controlling the gain of said second channel as a function of the rectified output of said first channel, and means including said second amplifier channel for deriving a rectified current corresponding to the output of said channel and for applying said current to oppose the displacement of said control element upon operation at rates exceeding a predetermined velocity.

6. A position control system including a control element, a controlled element, a two phase motor for driving said controlled element, means responsive to the relative displacement of said elements for deriving alternating currents proportional to said displacement, a rectifier, differentiating means for applying said derived alternating currents to said rectifier to obtain therefrom rectified currents corresponding to the rate of said displacement, a first amplifier channel including a class B amplifier for amplifying said derived currents and applying amplified currents of one phase to said motor, means for applying the said rectified currents to control the amplification of said channel, a second amplifier channel and including a class B amplifier for applying alternating currents of a second phase to said motor, and means including the class B amplifier of said first channel for applying to said second channel a rectified current corresponding to the output of said first channel to control the amplification of said second channel.

JAMES W. CONKLIN.

REFERENCES CITED

The following references are of record in the file of this patent:

UNITED STATES PATENTS

| Number | Name | Date |
| --- | --- | --- |
| 2,068,490 | Hull | Jan. 19, 1937 |
| 2,088,654 | Hull | Aug. 3, 1937 |